F. F. Smith,
Plow Coulter.
No. 85,971. Patented Jan. 19, 1869.
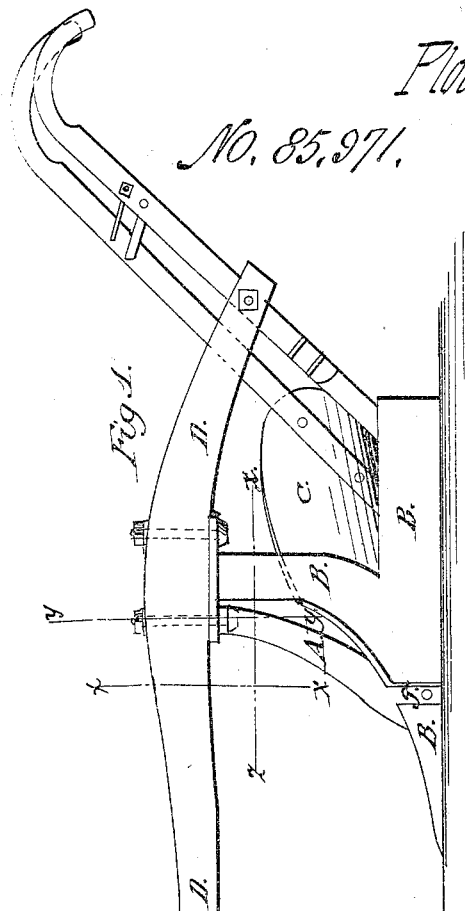
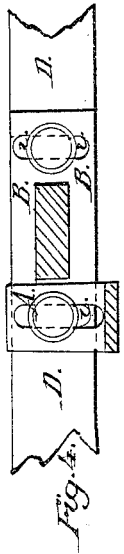
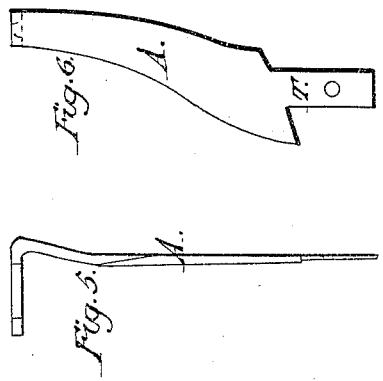
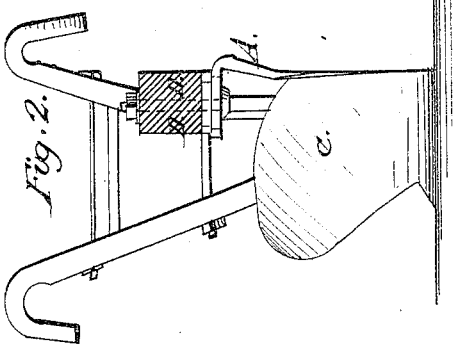
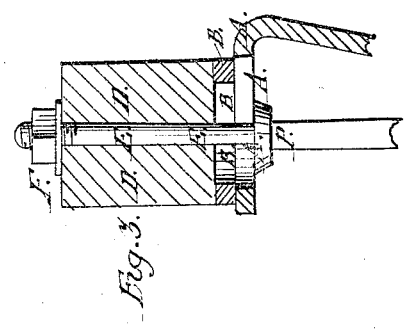
Witnesses:
Albert L. Thayer
Edward H. Sears
Inventor:
F. F. Smith

United States Patent Office.

FRANCIS F. SMITH, OF COLLINSVILLE, CONNECTICUT, ASSIGNOR TO HIMSELF AND THE COLLINS COMPANY, OF SAME PLACE.

*Letters Patent No. 85,971, dated January 19, 1869.*

IMPROVEMENT IN PLOW-COULTERS.

The Schedule referred to in these Letters Patent and making part of the same.

*To all whom it may concern:*

Be it known that I, FRANCIS F. SMITH, of Collinsville, in the county of Hartford, and State of Connecticut, have invented a new and useful Improvement in Plow-Coulters; and I do declare the following to be a full and exact description thereof, reference being had to the accompanying drawings, and to the letters of reference marked thereon, making a part of this specification.

Plows have been made heretofore, in which the beam was adjustable to the right or left.

To such adjustable beams, sword or other coulters have sometimes been fastened, which moved entire to the right or left with the beam, in adjusting.

More rarely, sword-coulters have been fastened at their foot to the landside, and the top only has swung to the right or left with the beam.

In all these, the coulter, in plowing, has had to cut the earth in something other than a direct line in front of the cutting-edge of the plow, making the plow, when thus adjusted out of such direct line, difficult to hold and keep in its place.

It should be remarked that it is desirable at times to adjust the beam to the right or left, in order to widen or narrow the furrow.

The object of my improvement is to enable the plowman to widen or narrow his furrow at will, by adjusting the beam, and at the same time keep the position of the coulter at all times, throughout its whole length, the same with reference to the cutting-edge of the plow; at all times, directly in front of the cutting-edge; thus making the plow in all positions of adjustment easy to hold, and obliging it to always cut a smooth and handsome furrow.

Besides, keeping the coulter always in this direct line between the point of the plow and the beam, gives the point additional strength.

My improvement applies to sword-coulters only.

In the drawings, the same letter always indicates the same parts.

A represents the coulter.
B represents the landside.
C represents the share.
D represents the beam.

In Figure 1, (a side elevation,) it will be seen that the coulter is fastened to the landside at T, by a method now in use, and which I do not claim.

In Figure 2, (a front elevation,) the coulter A is seen in the position it always occupies with reference to the cutting-edge of the plow, directly in front of it.

In Figure 3 will be seen the method of attaching the top of the coulter to the beam. D is a cross-section of the beam; E is the bolt fastened at the top by nut F, and running down through the beam, down through the sidewise slot in the cap of the landside B, and further down through the sidewise slot in the top of the coulter A, and headed at P. The uncolored parts in A and B represent said sidewise slots, which may be of any desired length. The bent top of the coulter fits flatly against the under side of the landside-cap, and the slots just fit to each other. There are two of these sidewise slots in the cap of the landside, after the old fashion. The slot in the coulter-top can be made attachable over as well as under the beam, but I prefer the latter. It will be readily comprehended that by means of these sidewise slots in both landside-cap and coulter-top, the beam can be adjusted right or left without altering the position of A and B with reference to each other, and this is wherein my improvement consists.

Figure 4 shows the bottom of the beam D, the cap of the landside B with its two slots *i i, i i*, and the top of the coulter A overlying the front part of the landside-cap, the slot in the coulter-top just fitting over the front slot in the landside-cap.

Figure 5 is a front view of the coulter A.
Figure 6 is a side view of the coulter A.

I believe that the above description fully explains the construction and working of my improvement.

I expressly disclaim all that is generally known to be old, and all that I have mentioned as old; but What I do claim, and desire to secure by Letters Patent, is—

The combination, above described, of the coulter A attached to the beam D, by means of the sidewise slot in the top of the coulter, so that the beam shall be adjustable in a sidewise direction, without altering the position of the coulter with reference to the landside.

F. F. SMITH.

Witnesses:
OLIVER F. PERRY,
J. H. BIDWELL.